Patented Apr. 29, 1941

2,239,720

UNITED STATES PATENT OFFICE 2,239,720

SULPHOPOLYCARBOXYLIC ACID AMIDES

Morris Katzman, Chicago, Ill., assignor to The Emulsol Corporation, Chicago, Ill., a corporation of Illinois No Drawing. Application July 27, 1939, Serial No. 286,777

15 Claims. (Cl. 260—401)

This invention relates to new chemical compounds in the form of sulphonic derivatives which are characterized by possessing interface modifying properties rendering the same highly useful for the purposes for which such agents are employed in the various arts.

At least most of the novel sulphonic compounds fall within the scope of the general formulae

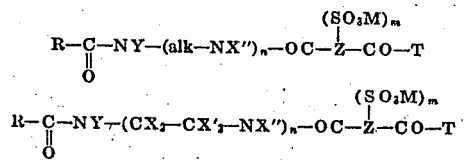

wherein

is an acyl radical containing at least four carbon atoms and particularly from twelve to eighteen carbon atoms, Y, X, X' and X'' are the same or dissimilar members selected from the group consisting of hydrogen, alkylol, alkyl, and cycloalkyl, alk is a hydrocarbon residue, saturated or unsaturated, with or without interruptions or substitutions, Z is a residue, generally a carbon-hydrogen residue of a poly-carboxylic acid, containing preferably less than eight carbon atoms, T is (1) a member of the group comprising NHR' where R' is hydrogen, lower alkyl, hydroxy-alkyl, and cycloalkyl, and (2) OY where Y is a cation, lower alkyl, cycloalkyl and aliphatic polyhydric alcohol radicals, M is a cation, $m$ is a whole number, preferably one or two, and $n$ is a whole number, preferably from one to four.

A more limited aspect of the compounds of the invention may be represented by the general formula

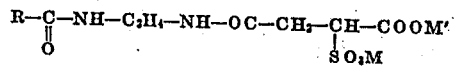

wherein

is an acyl radical containing at least eight and preferably from twelve to eighteen carbon atoms, and M and M' are cations.

The acyl radical

in the above formulae may be of aliphatic, cycloaliphatic, aromatic or aromatic-aliphatic character, as will be pointed out hereinafter, and may contain substituent groups such as amino, halogen, hydroxy, sulphate, sulphonic, phosphate, carboxyl, nitrile, and the like, but it is particularly preferred that it be unsubstituted aliphatic or fatty and contain from twelve to eighteen carbon atoms. Z and alk may also each contain substituent groups such as those mentioned and the sequence of carbon atoms therein may be interrupted by O, S, C=O, NH, NR where R is alkyl, and the like.

The substances of the invention may also be considered as derivatives of polyamines in which hydrogen of at least two different amine groups is replaced by different radicals, (1) a carboxylic acyl radical containing at least four but preferably from eight to eighteen carbon atoms, and (2) a carboxylic acid acyl radical of a sulphopolycarboxylic acid, particularly aliphatic sulphodicarboxylic and having not more than eight carbon atoms.

In order that the nature of the invention may become apparent, there are listed hereinbelow representative compounds which fall within the scope of the invention.

(1)
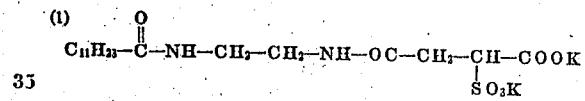

(2)

(3)
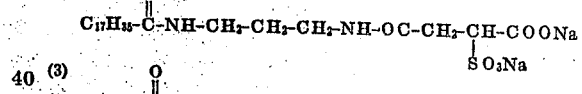

(4)
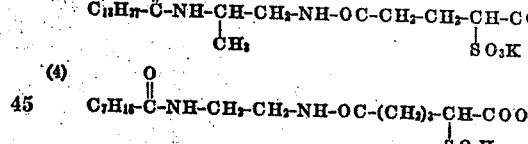

(5)
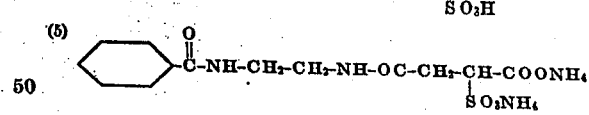

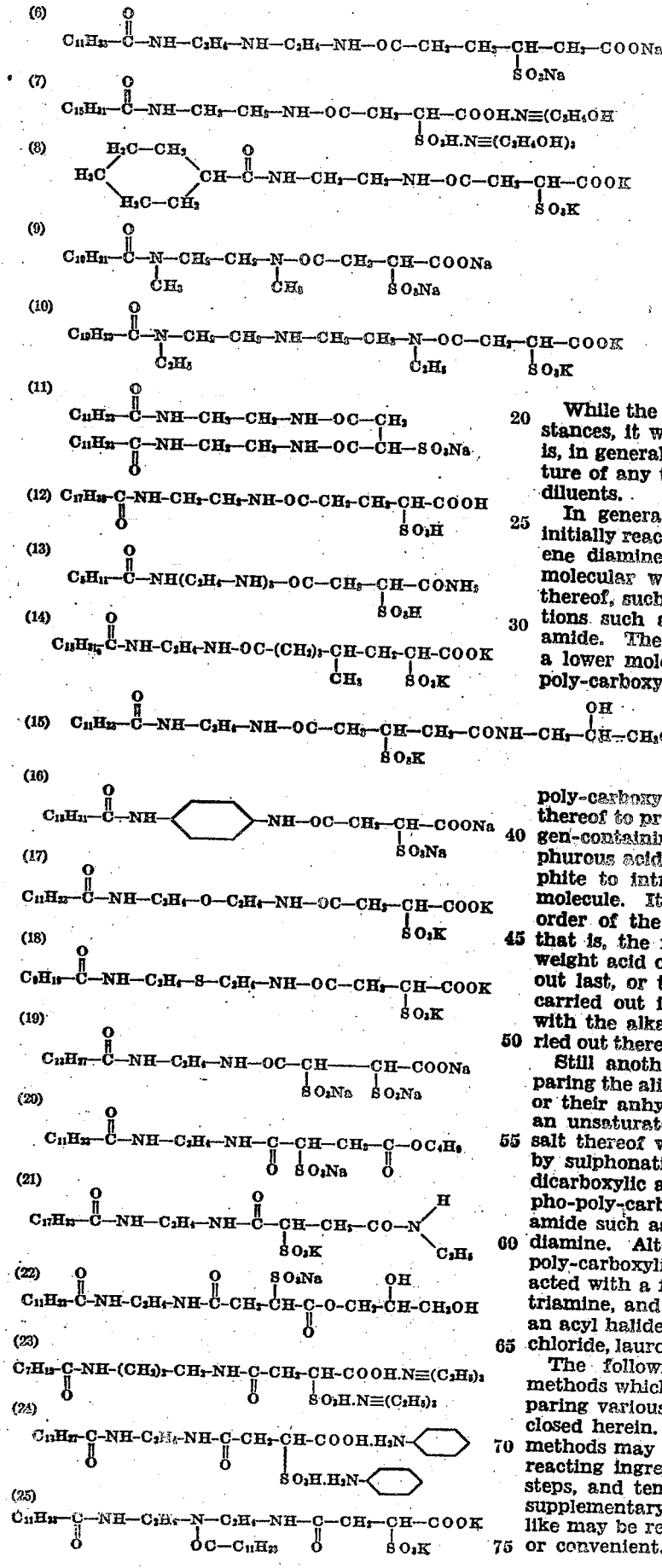

While the above examples represent single substances, it will be understood that in practice it is, in general, more advantageous to employ mixture of any two or more thereof with or without diluents.

In general, the compounds are prepared by initially reacting a polyamine, for example, ethylene diamine ($H_2N-C_2H_4-NH_2$), with a higher molecular weight carboxylic acid or derivative thereof, such as an ester or halide, under conditions such as to insure a substantial yield of amide. The resulting amide is then reacted with a lower molecular weight aliphatic unsaturated poly-carboxylic acid or anhydride or a halogeno-poly-carboxylic acid or halide or other derivative thereof to produce the unsaturated ester or halogen-containing ester, and then with a salt of sulphurous acid such as an alkali sulphite or bisulphite to introduce a sulphonic group into the molecule. It will be clear, of course, that the order of the steps may be reversed if desired; that is, the reaction with the higher molecular weight acid or derivative thereof may be carried out last, or the two amidification steps may be carried out in optional order and the reaction with the alkali sulphite or the like may be carried out thereafter.

Still another method comprises initially preparing the aliphatic sulpho-poly-carboxylic acids, or their anhydrides, for example, by reaction of an unsaturated aliphatic dicarboxylic acid or a salt thereof with an alkali or like bisulphite, or by sulphonation of a saturated or unsaturated dicarboxylic acid, and reacting the resulting sulpho-poly-carboxylic acid with a carboxylic acid amide such as the lauric acid amide of ethylene diamine. Alternatively, the aliphatic sulpho-poly-carboxylic acid or its anhydride may be reacted with a free amine, for example, diethylene triamine, and the resulting product reacted with an acyl halide, or other derivative, such as octoyl chloride, lauroyl bromide, or the like.

The following examples are illustrative of methods which have been found suitable for preparing various of the compounds which are disclosed herein. It will be appreciated that other methods may be utilized, that the proportions of reacting ingredients, times of reaction, order of steps, and temperature may be varied and that supplementary processes of purification and the like may be resorted to wherever found desirable or convenient. These and other variations and modifications will be evident to those skilled in the art in the light of the guiding principles which are disclosed herein.

Example A (1) 107.2 grams of the methyl ester of a mixture of substantially equal parts of lauric and myristic acids and 52.6 grams of hydroxy ethyl ethylene diamine were heated together for a period of 1½ hours, with stirring, at a temperature from 160 degrees C. to 250 degrees C.

(2) 31 grams of the product produced in part (1) hereof and 11 grams of maleic anhydride were warmed to 50 degrees C., with stirring, whereupon the temperature spontaneously rose to 90 degrees C. where it was maintained for a few minutes.

(3) 12.3 grams of the reaction product produced in part (2) hereof, 6.6 grams of sodium bisulphite and 40 cc. of water were heated for 10 minutes, with stirring, at 60 degrees C. to 70 degrees C.

The final product was a clear liquid, possessed good foaming properties in both acid and alkali aqueous media, and contained a substantial proportion of a compound having the following probable formula:

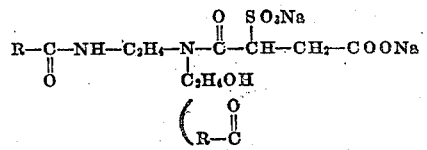

is the acyl radical corresponding to the mixture of lauric and myristic acids).

Example B 10 grams of the reaction product produced in part (1) of Example A hereinabove and 7 grams of sulpho maleic anhydride were mixed together at a temperature of approximately 30 degrees C., whereupon the temperature spontaneously rose to about 100 degrees C. The reaction mass was then cooled to 70 degrees C., dissolved in 100 cc. of isopropyl alcohol, cooled to 30 degrees C., and neutralized with 150 cc. of 0.5 N alcoholic potassium hydroxide. The precipitate was then filtered off from the solution and said precipitate was then dried. It had good foaming properties and contained a substantial proportion of a compound having the following probable formula:

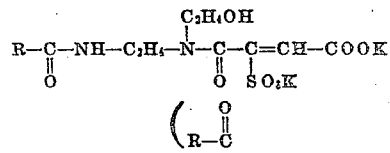

is the acyl radical corresponding to the mixture of lauric and myristic acids).

Example C (1) To 30.4 grams of a 70% aqueous solution of ethylene diamine 25 cc. of water were added and then 39.2 grams of maleic anhydride were added slowly and with stirring. The temperature spontaneously rose from 25 degrees C. to 75 degrees C. The reaction mass was then cooled to 20 degrees C. and there were added thereto, slowly and while stirring and cooling, 16.4 grams of sodium hydroxide previously dissolved in 75 cc. of water. The temperature rose to approximately 30 degrees C.

(2) To the reaction product of part (1) hereof there were added dropwise, with stirring and cooling, 87.2 grams of lauroyl chloride and simultaneously therewith there were also added, dropwise and with stirring, 16.4 grams of sodium hydroxide previously dissolved in 100 cc. of water. The addition of the lauroyl chloride and the solution of sodium hydroxide took place over a period of ½ hour and the temperature rose to 60 degrees C. The final product was just alkaline to phenolphthalein.

(3) To the reaction product of part (2) hereof, there were added 100 cc. of water, and 83 grams of sodium bisulphite previously dissolved in 50 cc. of water. The resulting mass was stirred at 60 degrees C. for approximately 15 minutes.

(4) One-half of the reaction mass of part (3) hereof was allowed to dry in the atmosphere and the drying was then finished in an oven at 110 degrees C., the residue being a powder having good foaming properties.

(5) 150 grams of the reaction product of part (3) hereof were mixed with 1000 cc. of boiling isopropyl alcohol and the mass was filtered. The precipitate, which contained the desired compound together with inorganic ingredients, was soluble in water and had good foaming properties.

The product of parts (4) and (5) hereof contained a substantial proportion of a compound having the following probable formula:

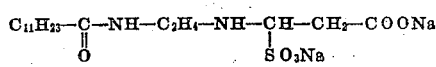

Example D 12 grams of the reaction product of part (1) of Example A hereinabove were dissolved in 25 cc. of dioxane and there were added thereto, slowly and with stirring, 10 grams of molten sulpho phthalic anhydride. The temperature rose from 40 degrees C. to 95 degrees C. After a few minutes, 200 cc. of isopropyl alcohol were added to the reaction mixture and the mass was cooled to 30–35 degrees C. and then neutralized with 150 cc. of approximately 0.5 N alcoholic potassium hydroxide, the reaction mass being just neutral to phenolphthalein. The precipitate was allowed to settle and the alcoholic solution was then decanted therefrom. In order to dry the precipitate, 100 cc. of ethyl ether were added thereto and mixed well and then filtered on the Buchner funnel. The final reaction product was a cream colored powder, quite hygroscopic, very soluble in water, had good foaming and detergent properties and contained a substantial proportion of a compound having the following probable formula:

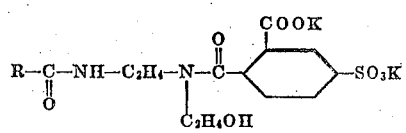

The acyl radical represented by R—CO in the general formulae may, as stated, be derived from various sources. Among such sources may be mentioned straight chain and branched chain carboxylic, aliphatic, and fatty acids or derivatives thereof such as halides, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as 1-hydroxy stearic acid, dihydroxy stearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydro-aromatic acids such as hexahydrobenzoic acid, resinic acid, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

The sulpho-poly-carboxylic acid radical of the compounds of my invention may be selected, among others, from the following illustrative members: sulphofumaric acid, sulphomaleic acid, sulphosuccinic acids, sulphomalonic acid, sulphoglutaric acid, sulphoadipic acid, sulphopimelic acid, sulphoazelaic acid, sulphocitraconic acid, sulphosebacic acid, sulphomesaconic acid, sulphosuberic acid, sulphoaconitic acid, sulphoitaconic acid, sulphoglutaconic acid, sulphomucic acid, aromatic sulpho-polycarboxylic acids such as sulpho-phthalic acids, and the like. The sulpho-poly-carboxylic acid radicals may, in certain cases, contain substituent groups such as halogen, cyanogen, amino, hydroxy, lower alkyl such as ethyl, and the like, but, in general, the best results are obtained when the sulpho-poly-carboxylic acid radical is aliphatic, contains not more than eight carbon atoms, and is otherwise unsubstituted.

The polyamines which are employed in the reactions may be selected from a large group, particularly in the alkylene polyamines and polyalkylene polyamines and the alkyl and aralkyl derivatives as, for example, ethylene diamine, piperazine, diethylene triamine, triethylene tetraamine, mono-methyl ethylene diamine, benzidine, phenylene diamines such as orthophenylene diamine and paraphenylene diamine, mono-ethyl diethylene triamine, beta-dimethyl-amino-ethyl amine, and the like.

In the event that the sulphonic compounds of the present invention are made by reacting the halogen derivatives with an alkali sulphite or other soluble sulphites as well as thiosulphates, the corresponding alkali sulphonic acid derivative is produced. When prepared by other methods, other sulphonic acid salts may be produced, or the alkali sulphonates can be converted into other salts by methods such as described in the application of Benjamin R. Harris, Serial No. 190,136, filed February 11, 1938. Thus, the cation represented by M in the general formulae set forth hereinabove may be calcium, magnesium, aluminum, zinc, organic nitrogenous bases as, for example, alcohol amines and alkylol-, arylol- and aralkylol amines including mono-, di- and triethanolamine and mixtures thereof such as are, for example, present in so-called commercial triethanolamine, propanolamines, butanolamines, pentanolamines, hexanolamines, glycerolamines, dibutyl ethanolamine, diethanol ethyl amine, cyclohexyl ethanolamine, diethanol cyclohexylamine, ethanol aniline, alkylol polyamines such as alkylol derivatives of ethylene diamine, monomethyl monoethanolamine, diethyl-monoethanolamine, 1-amino-2,3-propanediol, 1,2-diaminopropanol; alkylamines such as butyl amine, hexylamine, dimethylamine, ethylene diamine, diethylene triamine, triethylene tetra-amine, mono-methyl ethylene diamine, mono-ethyl diethylene tetra-amine, mono-allyl amine, aromatic and heterocyclic bases such as benzylamine, cyclo-hexylethyl-aniline, morpholine, pyridine, alkyl pyridines such as methyl-pyridine, piperidine, pyrrolidines, quinoline, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

The compounds of this invention have utility in various arts in which interface modifying agents are employed. They are resistant to precipitation by calcium and magnesium salts and are compatible with acid and alkali media. They may be utilized in washing and laundering and in the textile and related industries wherein they function for softening, wetting, detergent, emulsifying, penetrating, dispersing, frothing, and foaming purposes. The textiles, various treatments of which in the presence of the agents of the present invention are rendered effective, comprise natural products such as cotton, wool, linen, and the like, as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oilfield operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene gylcol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulpho-acetate, dioctyl sodium sulphosuccinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl naphthalene sodium sulphonate, and other classes of wetting agents.

It will be understood that, in all cases, there is present in the molecules of the sulphonic derivatives of the present invention at least one sulphonic acid radical, although, depending upon the particular reacting ingredients and the proportions thereof utilized, more than one sulphonic group may be introduced.

Wherever the term "higher" is employed as referring to higher molecular weight organic acids or the like, it will be understood to cover at least eight carbon atoms unless otherwise specifically stated and, concomitantly, the term "lower" will mean less than eight carbon atoms.

Whenever the term sulpho-poly-carboxylic acid radical, sulpho-dicarboxylic acid radical, sulpho-succinic acid radical, or the like expression is employed in the claims, it will be understood to cover the compounds irrespective of whether the hydrogen of the sulphonic or carboxylic acid radical is present as such or replaced by another cation, unless the connotation otherwise expressly indicates differently.

The present application is a continuation-in-part of application, Serial No. 222,779, filed August 3, 1938, now Patent No. 2,198,806, issued April 30, 1940.

What we claim as new and desire to protect by Letters Patent of the United States is:

1. A chemical compound corresponding to the general formula

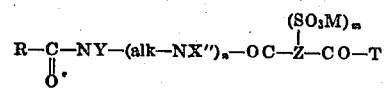

wherein

is an unsubstituted acyl radical containing at least four carbon atoms, Y and X″ are members selected from the group consisting of hydrogen, alkyl, cycloalkyl and alkylol, alk is a member selected from the group consisting of hydrocarbon and substituted hydrocarbon residues, Z is the residue of an aliphatic poly-carboxylic acid, T is (1) a member of the group NHR′ where R′ is hydrogen, lower alkyl, hydroxyalkyl, or cycloalkyl, and (2) OY where Y is a cation, lower alkyl, cycloalkyl and aliphatic polyhydric alcohol radicals, M is a cation, and $m$ and $n$ are small whole numbers.

2. Chemical compounds corresponding to the general formula

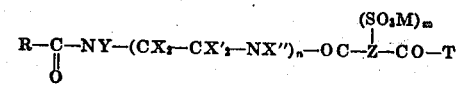

wherein

is an unsubstituted aliphatic acyl radical containing from twelve to eighteen carbon atoms, Y, X, X′ and X″ are members selected from the group consisting of hydrogen, alkyl, cycloalkyl and alkylol, Z is the residue of an aliphatic dicarboxylic acid containing not more than eight carbon atoms, T is (1) a member of the group NHR′ where R′ is hydrogen, lower alkyl, hydroxyalkyl, or cycloalkyl and (2) OY where Y is a cation, lower alkyl, cycloalkyl and aliphatic polyhydric alcohol radicals, M is a cation, $m$ is one or two, and $n$ is a small whole number.

3. Chemical compounds corresponding to the general formula

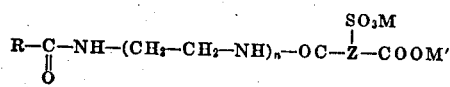

wherein

is a fatty acid acyl radical containing from twelve to eighteen carbon atoms, Z is a hydrocarbon residue of an aliphatic dicarboxylic acid containing from four to eight carbon atoms, M and M′ are cations, and $n$ is a whole number ranging from one to three.

4. Chemical compounds corresponding to the general formula $$R-\underset{\underset{O}{\|}}{C}-NH-C_2H_4-NH-OC-CH_2-\underset{\underset{SO_3M}{|}}{C}H-COOM'$$

wherein $$R-\underset{\underset{O}{\|}}{C}$$

is an acyl radical containing from twelve to eighteen carbon atoms, and M and M' are cations.

5. Chemical compounds corresponding to the general formula $$C_{11}H_{23}-\underset{\underset{O}{\|}}{C}-NH-(C_2H_4-NH)_n-OC-CH_2-\underset{\underset{SO_3M}{|}}{C}H-COOM'$$

wherein n is a small whole number and M and M' are alkali metal cations.

6. Chemical compounds corresponding to the general formula $$R-\underset{\underset{O}{\|}}{C}-NH-(CX_2-CX'_2-NX'')_n-OC-\underset{\underset{SO_3M}{|}}{Z}-COOM'$$

wherein $$R-\underset{\underset{O}{\|}}{C}$$

is an aliphatic acyl radical containing at least eight carbon atoms, X, X' and X'' are members elected from the group consisting of hydrogen, alkyl, cycloalkyl and alkylol, Z is a hydrocarbon residue of an aliphatic dicarboxylic acid containing not more than eight carbon atoms, M' is a cation, M is an organic nitrogenous base cation, and n is a whole number.

7. Chemical compounds corresponding to the general formula $$R-\underset{\underset{O}{\|}}{C}-NH-(alk-NH)_n-OC-CH_2-\underset{\underset{SO_3M}{|}}{C}H-COOM'$$

wherein $$R-\underset{\underset{O}{\|}}{C}$$

is an aliphatic acyl radical containing from eight to eighteen carbon atoms, alk is an aliphatic hydrocarbon residue, M and M' are cations, and n is a whole number.

8. Chemical compounds corresponding to the general formula $$R-\underset{\underset{O}{\|}}{C}-NH-(C_2H_4-NH)_n-OC-CH_2-\underset{\underset{SO_3M}{|}}{C}H-COOM'$$

wherein $$R-\underset{\underset{O}{\|}}{C}$$

is a fatty acid acyl radical containing from eight to eighteen carbon atoms, M and M' are alkali metal cations, and n is a whole number.

9. Chemical compounds corresponding to the general formula $$R-\underset{\underset{O}{\|}}{C}-NH-(C_2H_4-NH-)_n-OC-\underset{\underset{SO_3M}{|}}{C}H-CH_2-COOM'$$

wherein $$R-\underset{\underset{O}{\|}}{C}$$

is an acyl radical containing from eight to eighteen carbon atoms, M and M' are cations, and n is an integer at least one.

10. A method of preparing chemical compounds which comprises reacting, in optional order, a polyamine with a member selected from the group consisting of carboxylic acids and derivatives thereof containing at least four carbon atoms to produce a substantial yield of an amide of said polyamine, then reacting the resulting amide with a member selected from the group consisting of aliphatic unsaturated poly-carboxylic acids, anhydrides thereof, and aliphatic halogeno-poly-carboxylic acids and halides thereof, followed by reacting the resulting product with a salt of sulphurous acid.

11. The method of claim 10 wherein the polyamine falls within the scope of the formula $$H_2N-(CX_2-CX'_2-NH-)_n-H$$

where X and X' are members selected from the group consisting of hydrogen, alkyl, cycloalkyl and alkylol, and n is an integer at least one.

12. The method of claim 10 wherein the polyamine falls within the scope of the following formula $$H_2N-(C_2H_4-NH-)_n-H$$

wherein n is an integer at least one, and the polycarboxylic-acid or derivative thereof is selected from the group consisting of fumaric acid, maleic acid, and maleic anhydride.

13. A polyamine in which hydrogen of an amine group is replaced by an unsubstituted carboxylic acyl radical containing at least four carbon atoms, and in which hydrogen of a different amine group is replaced by the carboxylic acyl radical of an aliphatic-sulpho-poly-carboxylic acid containing not more than eight carbon atoms.

14. A polyamine in which hydrogen of an amine group is replaced by an unsubstituted fatty acid acyl radical containing from twelve to eighteen carbon atoms, and in which hydrogen of a different amine radical is replaced by the carboxylic acyl radical of an aliphatic-sulpho-di-carboxylic acid containing not more than eight carbon atoms.

15. An aliphatic diamine in which hydrogen of one amine group is replaced by the carboxylic acyl radical of an aliphatic carboxylic acid containing from twelve to eighteen carbon atoms, and in which hydrogen of the other amine group is replaced by the carboxylic acyl radical of sulphosuccinic acid.

MORRIS KATZMAN.